Jan. 7, 1964  J. L. BARBER  3,116,523
MOLD FOR PIPE FITTING SEALS
Filed May 21, 1962
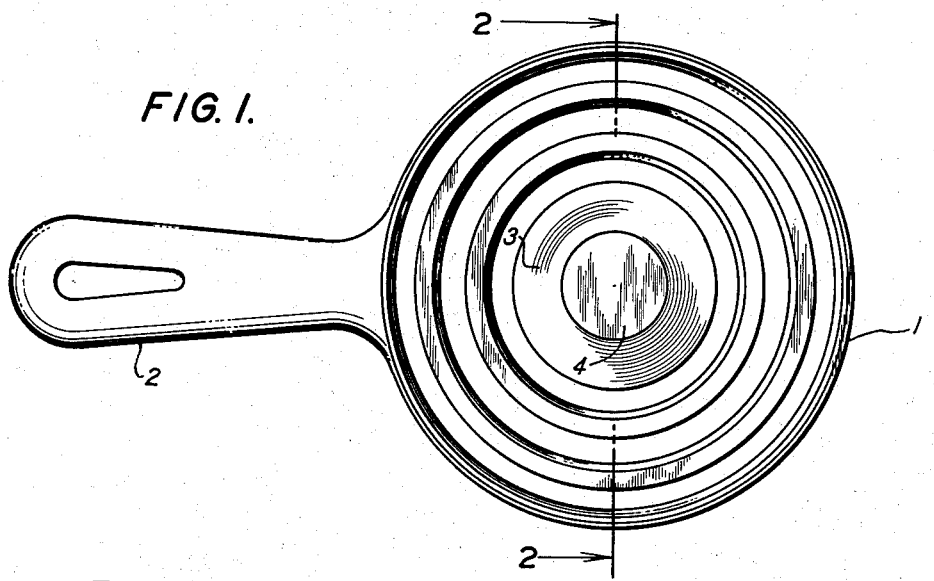
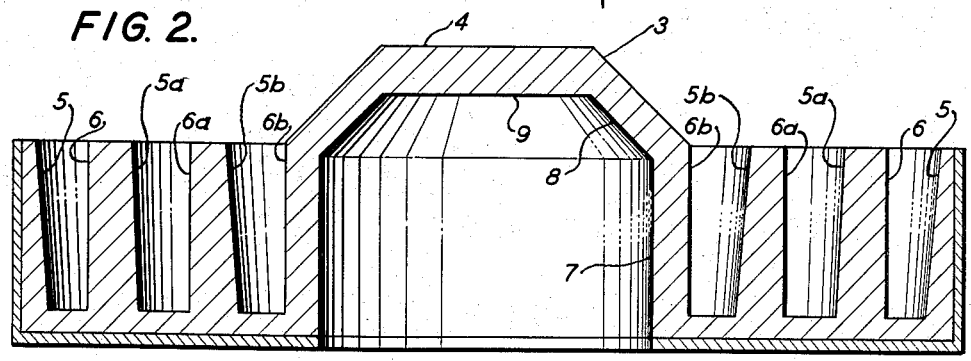
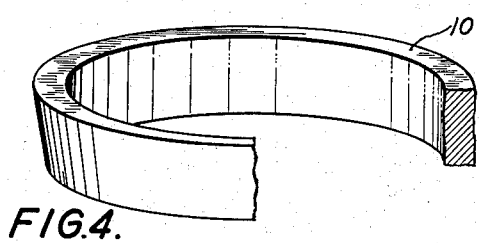
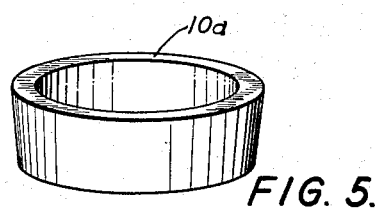
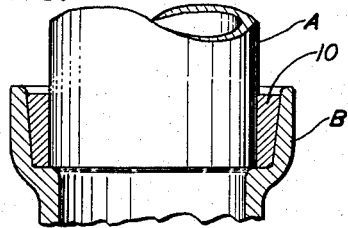
JIMMIE L. BARBER
INVENTOR.
BY *M. A. Gray*
AGENT

United States Patent Office 3,116,523
Patented Jan. 7, 1964

3,116,523
MOLD FOR PIPE FITTING SEALS
Jimmie L. Barber, Chino, Calif.
Filed May 21, 1962, Ser. No. 196,247
1 Claim. (Cl. 22—136)

This invention relates to a mold for pipe fitting seals and is adapted to provide the standard sizes of seals during on-the-job assembly of plumbing joints.

The primary object of this invention is to supply the required seals for connecting the pipe joints without involving the usual delay in pouring the joints, where it is necessary to keep the molten lead in condition until needed or waiting until the lead is heated to the proper temperature for use. With the device of the present invention it is possible to mold enough seals to meet the needs of a particular job and then proceed to another location where the operation repeated. This mold is especially useful in the construction of a tract of homes where a delay in the pipe fitting by the plumbers may result in loss of time by the carpenters for example.

A further object of this invention is the raised top central portion which is used to aid in freeing the molded seals from the mold channels. This is accomplished by allowing the lead seal rings to cool sufficiently to retain the molded shape, then invert the mold and by tapping the raised center sufficiently to loosen the seal rings and deposit them near the place where they are to be used.

Although the foregoing objects are regarded as primary in this invention, other features will become apparent as the specification proceeds and from the illustration in the drawings, in which:

FIG. 1 is a top plan view of the mold for pipe fitting seals.

FIG. 2 is a sectional view taken on the line 2—2 of FIG. 1 and shown to a somewhat enlarged scale.

FIG. 3 illustrates one of the seal rings as it appears when used in a pipe joint, the flaring connector and seal being shown in section.

FIG. 4 shows one of the larger seals formed by the mold, with portions being broken away; and FIG. 5 shows one of the smaller seal rings formed by the mold.

Referring now to the accompanying drawings in detail, and more particularly to FIGS. 1 and 2, the mold is designated generally by the body portion 1 and the handle 2. The circular body 1 is provided with three uniformly spaced, concentric, depressed moulding units. The said molding units are provided with vertical inner walls 6, 6-a and 6-b and slightly tapered side walls 5, 5-a and 5-b, while the bottom of the molding units is flat. This shape of mold provides a seal ring 10 adapted to closely fit the pipe end A while the outwardly flaring joint member B allows the tapering outer wall of the seal 10 to seat properly in the said member B.

The underneath central portion of the mold is provided with a reentrant hollow portion 7, 8, 9 with the portions 8, 9 extending somewhat above the upper edge of the mold to result in a frusto-conical form 3, 4 at the top center thereof. Extending from the upper portion of the outer edge of the mold body and integral therewith is a handle 2.

Thus it will be seen that the device of the present invention provides a compact, convenient mold for the formation of pipe fitting seals as they are needed for the sealing of pipe joints on construction work, thereby avoiding unnecessary and costly delay.

Although specific forms of the invention have been shown and described, in preferred form, it is understood that various changes and modifications may be made, as deemed desirable within the scope of the appended claim:

I claim:

A mold having a circular body with a flat upper face and provided with a hollow upwardly projecting central portion, and an integrally formed radially projecting handle extending from the side of said body, said body having a series of concentric channels in the upper face thereof, said channels being radially spaced from said central portion and from each other, the inner side walls of each said channels extending vertically and the outer walls of each of said channels extending upwardly and outwardly, whereby when mold material has hardened in said channels and said mold is inverted, the thus molded articles may be released from said mold by tapping said projecting portion.

References Cited in the file of this patent

UNITED STATES PATENTS

| 536,344 | Harrington | Mar. 26, 1895 |
| 1,104,927 | Pettis | July 28, 1914 |
| 1,503,122 | Frank | July 29, 1924 |
| 3,021,579 | Schmid et al. | Feb. 20, 1962 |

FOREIGN PATENTS

| 935,146 | Germany | Nov. 10, 1955 |